Aug. 4, 1942.   W. SAMANS   2,291,762
CATALYTIC APPARATUS
Filed Sept. 21, 1939   3 Sheets-Sheet 3

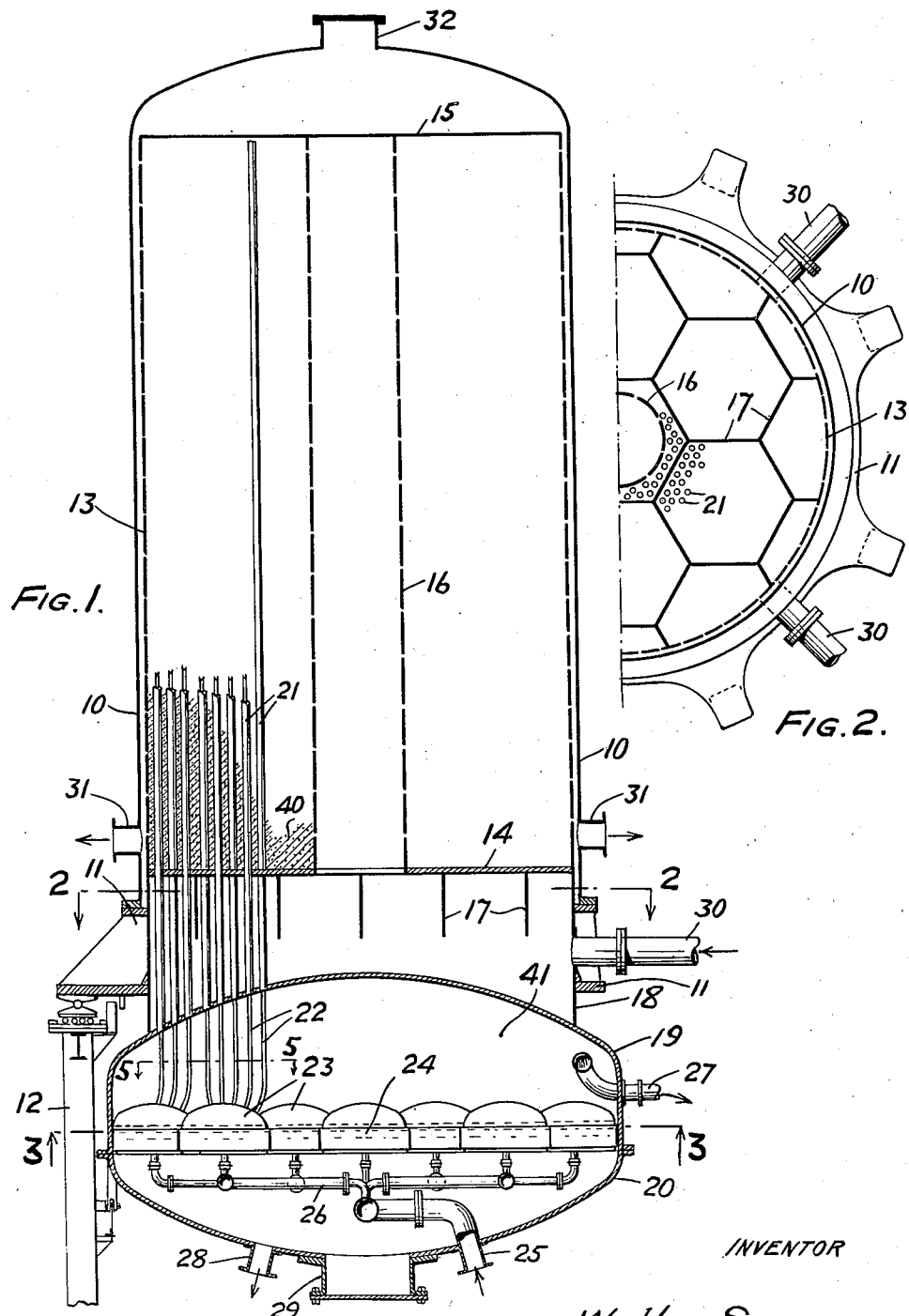

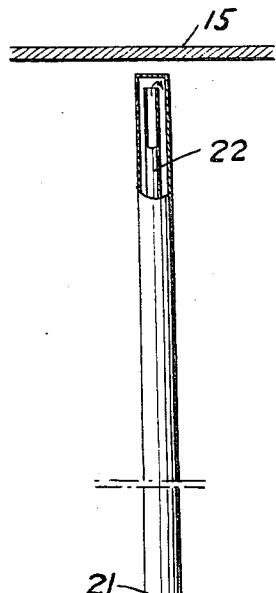
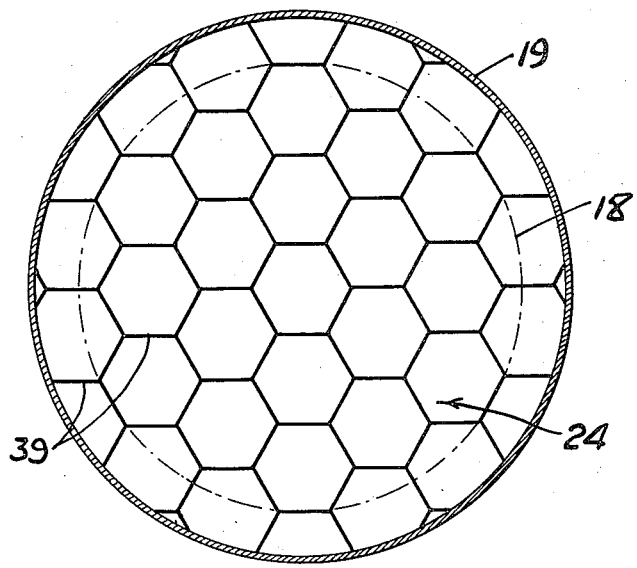
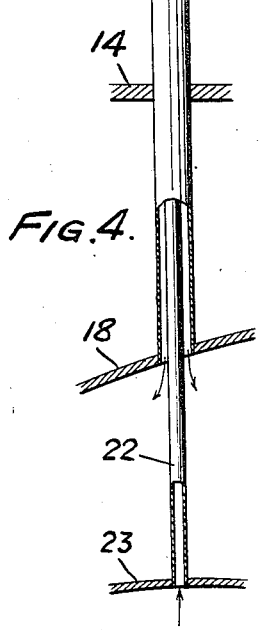
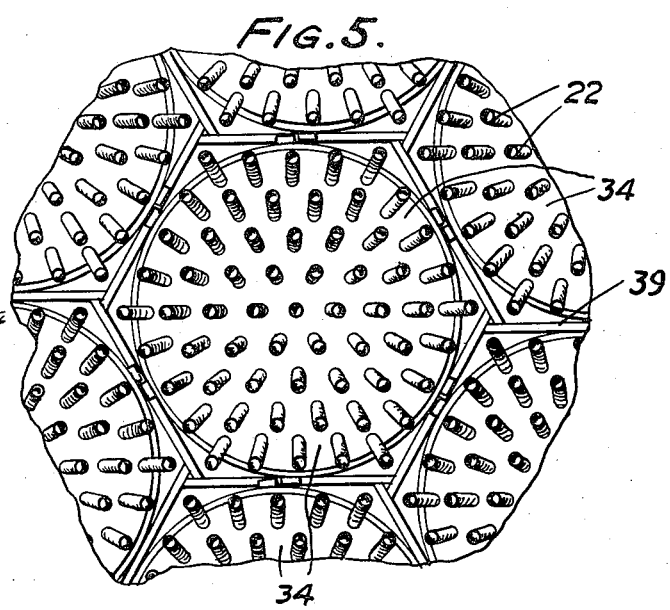

INVENTOR
Walter Samans
BY
Busser and Harding
ATTORNEYS.

WITNESS:

Patented Aug. 4, 1942

2,291,762

UNITED STATES PATENT OFFICE 2,291,762

CATALYTIC APPARATUS

Walter Samans, Philadelphia, Pa., assignor to Sun Oil Company, Philadelphia, Pa., a corporation of New Jersey Application September 21, 1939, Serial No. 295,932

18 Claims. (Cl. 23—288)

The present invention relates to a heat exchange apparatus and, more particularly, to a heat exchange apparatus designed for use in contact catalytic apparatus in which heat is exchanged between a fluid passing in contact with a solid catalyst and another fluid which is used to heat or cool the fluid in contact with the catalyst.

In many catalytic processes, it is necessary that the temperature of the reactant fluid or fluids contacting the catalyst be maintained within a relatively narrow range. It is also desirable that the temperature through the entire mass of catalyst be maintained uniform. In order to accomplish this desired result, it is necessary that heat exchange means be provided in the catalyst to supply heat to the reacting fluids during the time of contact therewith, if the reaction is an endothermic one, or to remove heat therefrom if the reaction is exothermic. Also, for economic operation, it is necessary to use relatively large catalytic chambers or convertors so that if heat exchange means are not provided within the convertor to control the temperature therein, relatively wide differences in temperature will occur between those parts of the catalyst near the center of the convertor and those parts near its walls. In order that the heat exchange apparatus may function efficiently, it is necessary that it be cleaned fairly regularly and also that it be inspected at regular intervals to insure its efficiency and safety. With the present large size convertors used, it is extremely difficult to dismantle the apparatus to inspect and clean the same.

The heat exchanger tubes which are embedded in the catalytic mass weigh a considerable amount and it is necessary that ample support be furnished for them.

It is, therefore, an object of the present invention to provide a heat exchange apparatus which may readily be dismantled for inspection and repair.

A further object of the invention is to provide suitable means for supporting the heat exchange apparatus.

Other further objects of the invention will be apparent from the following detailed description of my apparatus.

For a better understanding of the present invention, reference should be made to the accompanying drawings in which—

Fig. 1 is a vertical section of the complete apparatus of the present invention.

Fig. 2 is a section taken on lines 2—2 of Fig. 1.

Fig. 3 is a section taken on lines 3—3 of Fig. 1.

Fig. 4 is an elevation partly in section of one of the heat exchange tubes in my apparatus.

Fig. 5 is a detail plan view showing the heat exchange tube pattern.

Figure 6:
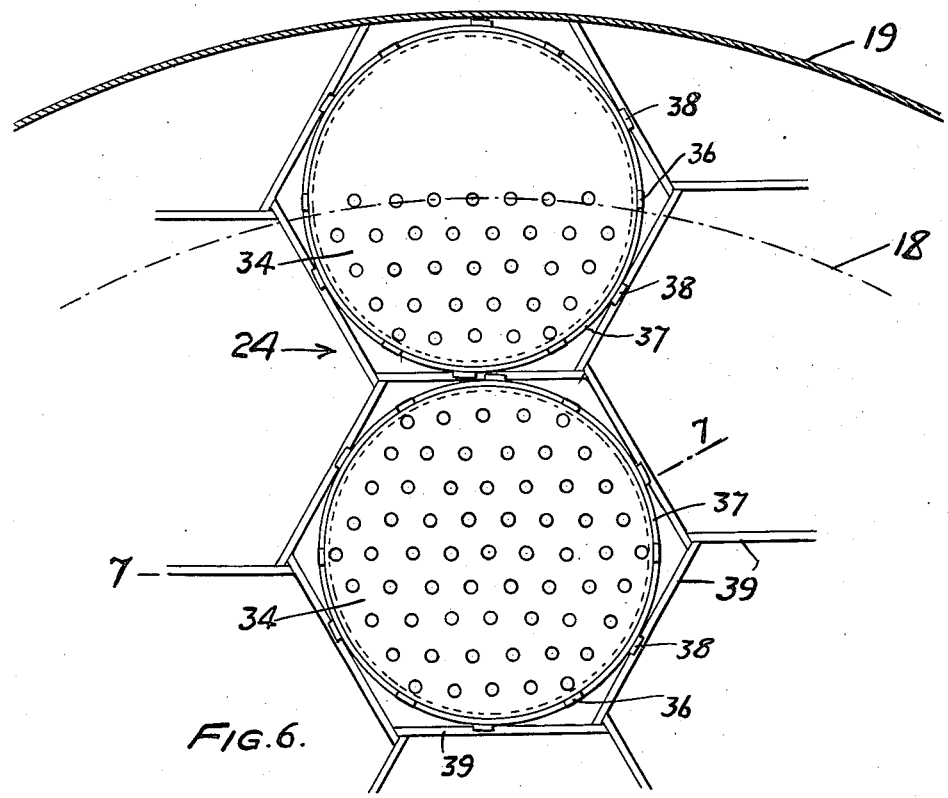
Fig. 6 is a detail plan view showing the supporting framework.

Referring now to the drawings, more particularly Fig. 1, 10 designates the outer casing of a catalytic convertor which is adapted to contain my heat exchange apparatus. A ring 11 supports the casing 10 and in turn is supported by columns 12. A catalyst envelope 13 is arranged within the casing 10 and supported by ring 11. The catalyst envelope is closed at the bottom by tube sheet 14 and at the top by sheet 15, the walls of the catalyst envelope being perforated between the sheets 14 and 15. Suitable fluid distributing means are provided within the catalyst envelope 13 being here illustrated as a central perforate fluid distributing conduit 16 extending through an opening of tube sheet 14 to the top plate 15 of the catalyst envelope. A suitable frame work of beams 17, hereinafter described in detail, is welded or otherwise attached to a depending annular skirt 18 which is supported by ring 11.

A pressure chamber 41 is attached to the bottom of the skirt 18. As illustrated in the drawings, this pressure chamber 41 is formed of two dished heads 19 and 20 which are bolted together. However, it is to be understood that it is contemplated that in case the pressure in chamber 41 is to be of such an order that a bolted joint about the circumference of chamber 41 would be undesirable, a pressure chamber of welded construction may be employed.

Heat exchange tubes 21 are rolled into the dished head 19 which serves as a tube sheet and pass through tube sheet 14 into the interior of the catlayst envelope which is filled with a suitable contact catalyst indicated at 40.

A hexagonal frame work 24, hereinafter described in detail, is attached to the cylindrical portion of chamber 41 and supports header boxes or distributing drums 23.

Inner heat exchange tubes 22 are rolled into the tops of distributing drums 23 and are of smaller diameter than the outer tubes 21 and extend almost to the top of such tubes as shown in detail in Fig. 4. The upper ends of tubes 21 are closed while the upper ends of inner tubes 22 are open. A heat exchange medium inlet pipe 25 extends through the head 20 of the chamber 41 and distributing pipes 26 connect the inlet pipe 25 with each of the distributing drums 23. A vapor outlet line 27 is provided from the chamber 41 and a liquid outlet 28 is also provided. A suitable access opening 29 is provided in the chamber 41. A fluid reactant inlet line 30 communicates with a reactant distributing manifold formed by the skirt 18 and tube sheets 14 and 19. A plurality of outlet lines 31 are provided in the wall of the casing 10 to help equalize the distribution or collection of the material subjected to catalytic action.

Figure 7:
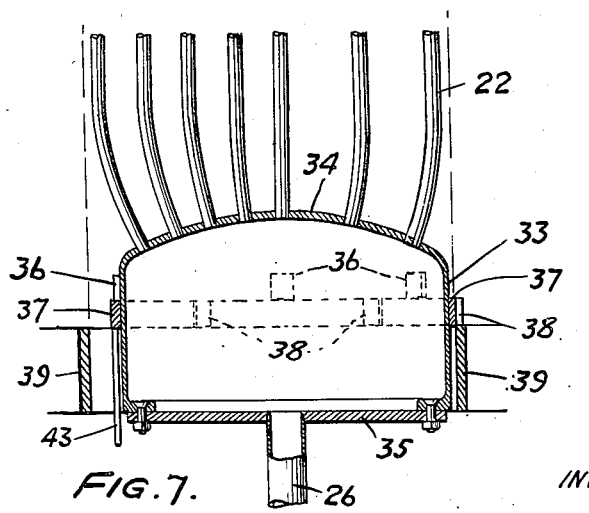
Fig. 7 is a section taken on lines 7—7 of Fig. 6.

The liquid distributing drums 23 are shown in detail in Figs. 6 and 7 and comprise a cylindrical body portion 33 whose top is closed by tube sheet 34 into which the heat exchange tubes 22 are rolled. The bottom of each drum is covered by removable plate 35 into which a fluid distributing pipe 26 is rolled. Six lugs 36 are welded to the walls of the body portion 33 of each distributing drum and a loose ring 37 having six lugs 38 thereon is slipped over the body portion 33 of the distributing drums and is free to rotate thereon. The ring 37 contacts the lugs 36 on a drum and thus supports the drum. The lugs 38 on ring 37 rest upon and are supported by the beams 39 of the hexagonal frame work 24.

Two handles 43 may be welded or otherwise attached to the rings 37 in order to provide means for rotating these rings and, if desired, the rings 37 may be locked in position when the lugs 38 thereon rest on the beams 37 by any desired means such as by bolting the handles 43 to the beams 39.

The pairs of concentric tubes 21, 22 are arranged in three series of straight rows, the rows of each series extending at an angle of 60° to the rows of each of the other two series. Thereby any three rows of three different series have a regular equilateral triangular arrangement. Such arrangement insures that each pair of tubes shall be equally spaced from all the (six) more nearly adjacent pairs of tubes.

The frameworks 17 and 24 are made of beams arranged to form hexagons, as shown in Fig. 3. Unless the beams are arranged to form triangular or hexagonal openings, they would necessarily obstruct the longitudinal movement of certain of the tubes 22 in assembling and disassembling as hereinafter described. If the beams were two-dimensional, having only length and height, they could be arranged as shown (diagrammatically) in Figs. 2 and 3; but since they possess appreciable width, they are not joined on their center lines but instead are slightly offset, as shown in Figs. 5 and 6, the preferable offset being one-half of the pitch between adjacent parallel rows of tubes. This enables the two straight rows of tubes on opposite sides of and parallel to any beam to be spaced equally from such beam, as may be clear from an inspection of Fig. 5. As applied to framework 24, it also facilitates the provision of the means, above described, providing for the support of the distributing drums and for their ready removal, with the tubes 22 connected thereto, from the convertor for inspection or repair. This removal is effected by first removing the dished head 20, if the pressure chamber 41 is provided with a bolted circumferential joint, and then removing each of the drums 23 by rotating the ring 37 until the lugs 38 thereon are opposite the apexes of the frame work 24. The drums 23 may then readily be slipped through the openings in the frame work 24 and as shown in Fig. 5 the tubes 22 will also pass through the openings of the frame work. In case the pressure chamber 41 is of welded design and the only access opening thereto is the opening 29, several slight modifications in the design shown may be necessary. In such case the tubes 22 must be made in lengths short enough to permit their placement in their respective tubes 21 within the space provided in chamber 41. Any desired type of joint, such as a coarse taper screw fit, may be used for the tubes 22. Preferably only a short stub of the tubes 22 is attached to the tops 34 of the drums 23. It is also necessary that sufficient clearance be provided in chamber 41 between the bottom of the hexagonal frame work 24 and the dished head 20 to permit the tube stubs to clear the frame work 24 when the drums 23 are lowered therethrough and moved over to and through the opening 29.

The frame work 24 supporting the drum 23 and frame work 17 supporting the tube sheet 14 need not have the same size openings but may have different size openings as shown by comparing Figs. 2 and 3. As shown in Fig. 5, and as hereinbefore explained with the regular tube pattern used, the tubes will readily pass through the openings in the frame work so long as the individual beams comprising the frame are slightly offset, as illustrated, and not joined on their center lines. Two additional important advantages of the hexagonal frame work are as follows:

The first advantage applies to a vessel at any operating temperature because the depth of the beams required may be made uniform throughout with respect to all and any diameters and less depth is required for that arrangement than for any form in which the lines of the framing are arranged of beams placed on parallel lines, or on two coordinates that may intersect at any angle; by the hexagonal pattern the load is without qualification distributed equally to all parts of the circumference of the supporting cylindrical shell and framework as long as the loading to be carried is symmetrical about the center. The second important advantage of the hexagon pattern is for framing subject to high operating temperatures. As long as the temperature in the framing is approximately uniform, the change in dimension, due to expansion under temperature, is uniform in all directions, and thus will avoid unequal stress concentrations; this is particularly important when the supporting cylinder is part of a vessel that is also subject to high stress resulting from internal pressure.

For a better understanding of the invention, a brief description of the operation of the apparatus is now given.

Fluid reactants are admitted through line 30 to the reactant distributing manifold and rise through the central distributing pipe 16 and pass through the perforations in the wall thereof, flowing radially through the mass of catalyst 21 contained in the catalyst envelope 13 and pass out through the perforations in the catalyst envelope into the space between casing 10 and the envelope 13, the fluid products of the reaction being withdrawn from the convertor through outlet lines 31. In order to maintain the desired temperature of the reaction, heat may be either added to or subtracted from the reactants passing through the catalyst, depending on whether the reaction is endothermic or exothermic respectively, by flowing a heat exchange medium, which is introduced through the inlet line 25 and distributing pipes 26 to each of the distributing drums 23, upwardly through each of the inner heat exchange tubes 22 to the top thereof and then down the outer heat exchange tubes 21 to the chamber 41, the heat exchange medium giving up to or taking out heat from the reactant fluids in the catalyst by indirect heat exchange. Any vapors formed in the heat exchange fluid may be withdrawn through line 27 which communicates with the chamber 41 above the liquid level therein while liquid heat exchange fluid may be withdrawn from chamber 41 through outlet line 28 and be cooled or heated in suitable apparatus (not shown) for reintroduction through line 25.

The ease with which the apparatus of the present invention can be assembled is one of its chief advantages. The catalyst envelope 13 is supported directly by the ring 11 on the columns 12. The casing 10 may readily be removed from the apparatus by merely unbolting it from the ring 11 and lifting it vertically by means of a crane or other suitable lifting apparatus. The heat exchange apparatus may readily be dissembled for inspection and repair by removing the dished head 20 and after disconnecting the distributing pipes 26, rotating the rings 37 on the header boxes 23 so that the lugs 38 are opposite the apexes of the hexagons and then dropping the header boxes and heat exchange tubes 22, attached thereto, downwardly out of the appaartus. A pit may be provided below the apparatus in order to assure sufficient room for removing the tubes from the convertor. Or in case a welded pressure chamber 41 is employed, the apparatus may be dissembled by removing the bolted cover from opening 29 and any obstructing parts of the manifold piping 26 are then removed, and the first joint in the tubes 22 disconnected from the tube stubs attached to the tops 34 of drums 23. The rings 37 may then be rotated until the lugs 38 thereon are opposite the apexes of the framework 24 and the drums with the tube stubs attached thereto dropped therethrough and moved over and through the opening 29. The tubes 22 may then be removed a section at a time. Once the tubes 22 are removed, the tubes 21 may readily be inspected without the necessity of removing them from the apparatus. Likewise the cover plates 35 on the header boxes 23 may be removed and the tubes 22 cleaned out and inspected.

It should also be noted that by arranging the tubes 22 in bundles, they may be more rapidly and readily removed than would be the case if each tube was to be individually removed. However, it is apparent that some means of support must be provided for the tubes and also for the bed of catalyst and heretofore it has been impossible to provide such support without seriously interfering with the regular spacing of the heat exchange tubes in the convertor. This is particularly true when attempts are made to arrange the tubes in bundles. It is therefore another great advantage of the present invention that the hexagonal frame work provides the necessary support, and at the same time in no way interferes with the regular tube pattern in the convertor.

It will be apparent to one skilled in the art that various modifications may be made in the present invention without departing from the spirit or scope thereof. For instance, the apparatus shown and described in the present application is intended for use with water as the heat exchange medium, and therefore the pressure chamber 19 is placed at the bottom of the convertor. However, should it be desired to use a heat exchange fluid having no material vapor pressure at the operating temperature used, it would then be practical to place the pressure chamber 41 at the top of the convertor. Various other changes in the proportion or the arrangements of the particular elements forming my apparatus may also be made while still utilizing the novel features thereof.

What I claim and desire to protect by Letters Patent is:

1. In a catalytic contact apparatus, the combination with a casing having fluid inlet and outlet openings therein, of a multiplicity of pairs of concentric heat exchange tubes extending into said casing, the inner tubes of said concentric pairs of heat exchange tubes being grouped in bundles, headers, one of each bundle, each of said headers being connected with the tubes of its corresponding bundle, a framework comprising beams forming openings corresponding in number to said headers, and means movable, relative to the headers and tubular connections, into one position to support the headers on said beams and into another position to allow the headers with their tubular connections to be withdrawn through said openings.

2. In a catalytic contact apparatus, the combination with a casing having fluid inlet and outlet openings therein, of a multiplicity of pairs of concentric heat exchange tubes extending into said casing, a manifold with which the larger and outer of said heat exchange tubes communicate, a plurality of header boxes within said manifold, the smaller and inner tubes of said heat exchange tubes being divided into groups of adjacent tubes, one group for each header box, extending into said manifold and communicating with the respective header boxes, and flow pipes for heat exchange fluid communicating respectively with the header boxes and with said manifold.

3. In a catalytic contact apparatus, the combination with a casing having fluid inlet and outlet openings therein, of a multiplicity of pairs of concentric heat exchange tubes extending into said casing, the inner tubes of said concentric pairs of heat exchange tubes being grouped in bundles, headers, one for each bundle, each of said headers being connected with all the tubes of its corresponding bundle, a supporting framework, rings, one enclosing each header, each ring being turnable into position to support its corresponding header and to be supported by said framework and being also turnable out of said position to allow its corresponding header and bundle of tubes to be withdrawn through said framework.

4. In a catalytic contact apparatus, the combination with a casing adapted to contain a catalyst, of a multiplicity of pairs of concentric heat exchange tubes extending into said casing and arranged in three series of rows, the rows of each series extending at an angle of 60° to the rows of the other two series, a manifold with which the larger or outer of said heat exchange tubes communicate, a number of headers in said manifold, the smaller and inner tubes of said heat exchange tubes being divided into groups of adjacent tubes, one group for each header, extending into said manifold and being therein connected with their corresponding headers, and a framework forming a nest of hexagonal openings in which said header boxes are adapted to be supported by said framework and through which said headers and said groups of tubes are adapted to be withdrawn.

5. In a catalytic contact apparatus, the combination with a casing adapted to contain a catalyst, of a multiplicity of pairs of concentric heat exchange tubes extending into said casing and arranged in three series of rows, the rows of each series extending at an angle of 60° to the rows of the other series, a framework supporting the casing, said framework having a multiplicity of hexagonal openings through each of which a group of said pairs of tubes extend, a manifold with which the larger and outer tubes communicate, a multiplicity of of header boxes arranged within said manifold, the several groups of the smaller and inner tubes extending into said manifold and having tubular connections with said header boxes respectively, a framework forming a nest of hexagonal openings in which said header boxes are supported by the last named framework and through which said header boxes and the groups of tubular connections thereto are adapted to be withdrawn.

6. In a catalytic contact apparatus, the combination with a casing adapted to contain a catalyst, of a multiplicity of pairs of concentric heat exchange tubes extending into said casing and arranged in three series of rows, the rows of each series extending at an angle of 60° to the rows of the other series, a framework supporting the casing, said framework having a multiplicity of hexagonal openings through each of which a group of said pairs of tubes extend, a manifold with which the larger and outer of said heat exchange tubes communicate, a plurality of header boxes arranged within said manifold and with which different groups of adjacent tubes of the inner and smaller of said heat exchange tubes communicate, and a framework adapted to support said header boxes and forming a nest of hexagonal openings through which said inner tubes of said heat exchange tubes are adapted to be withdrawn, each of said frameworks being formed of a plurality of beams arranged in a hexagonal pattern and having their ends slightly offset from one another.

7. In a catalytic contact apparatus, the combination with a casing adapted to contain a catalyst, of a multiplicity of pairs of concentric heat exchange tubes extending into said casing and arranged in three series of rows, the rows of each series extending at an angle of 60° to the rows of the other series, a framework supporting the casing, said framework having a multiplicity of hexagonal openings through each of which a group of said pairs of tubes extend, a manifold with which the larger and outer of said heat exchange tubes communicate, a plurality of header boxes arranged within said manifold and with which different groups of adjacent tubes of the inner and smaller tubes of said heat exchange tubes communicate, a framework forming a nest of hexagonal openings and adapted to support said header boxes, a loose rotatable ring surrounding each of said header boxes, projections on each of said header boxes adapted to contact said ring, six equal spaced projections on said ring adapted to contact the beams of said framework and adapted on rotation of said ring to be brought opposite the apexes of the hexagon formed by said framework, whereby said header boxes and said tubes attached thereto may be withdrawn through said framework.

8. In a catalytic contact apparatus, the combination with a casing adapted to contain a catalyst, of a multiplicity of heat exchange tubes extending into said casing and arranged in three series of rows, the rows of each series extending at an angle of 60° to the rows of the other two series, and a framework supporting the casing and forming a nest of hexagonal openings through which said heat exchange tubes extend.

9. In a catalytic contact apparatus, the combination with a casing adapted to contain a catalyst, of a multiplicity of heat exchange tubes extending into said casing and arranged in three series of rows, the rows of each series extending at an angle of 60° to the rows of the other two series, a framework supporting said casing formed of beams arranged in a hexagonal pattern and forming a nest of hexagonal openings through which said heat exchange tubes extend, the ends of each of said beams being slightly offset from the ends of adjacent beams, whereby said heat exchange tubes are adapted to extend through said openings.

10. In a catalytic contact apparatus, the combination with a casing adapted to contain a catalyst, of a multiplicity of heat exchange tubes extending into said casing and arranged in three series of rows, the rows of each series extending at an angle of 60° to the rows of the other two series, said tubes being divided into sets of adjacent tubes, a plurality of header boxes with which said sets of tubes respectively communicate, a framework supporting the header boxes and forming a nest of hexagonal openings through which said header boxes and communicating tubes are adapted to be withdrawn.

11. In a catalytic contact apparatus, the combination with a casing adapted to contain a catalyst, of a multiplicity of heat exchange tubes extending into said casing and arranged in three series of rows, the rows of each series extending at an angle of 60° to the rows of the other two series, said tubes being divided into sets of adjacent tubes, a plurality of header boxes with which said sets of tubes respectively communicate, a framework supporting the header boxes and formed of beams arranged in a hexagonal pattern, said beams having their ends slightly offset from adjacent beams and providing hexagonal openings through which said header boxes and communicating tubes are adapted to be respectively withdrawn.

12. In a catalytic contact apparatus, the combination with a casing adapted to contain a catalyst, of a multiplicity of heat exchange tubes extending into said casing and arranged in three series of rows, the rows of each series extending at an angle of 60° to the rows of the other two series, said tubes being divided into sets of adjacent tubes, a plurality of header boxes with which said sets of tubes respectively communicate, a framework comprising beams forming a nest of hexagonal openings, a loose rotatable ring surrounding each of said header boxes, projections on each of said header boxes adapted to contact said ring, and six equal spaced projections on said ring adapted to contact the beams forming the hexagonal openings and to thereby support the header boxes on the framework, said projections adapted on rotation of said ring to be brought opposite the apexes of said hexagons, whereby said header boxes and the tubes attached thereto may be withdrawn through said openings.

13. In a catalytic contact apparatus, the combination with a casing adapted to contain a catalyst, of a multiplicity of pairs of concentric heat exchange tubes extending through the casing and beyond the bottom thereof, said pairs of tubes being arranged in three series of rows, the rows of each series extending at an angle of 60° to the rows of the other series, a manifold with which the lower ends of the outer of said heat exchange tubes communicate, a number of header boxes arranged in three series of rows parallel to the above specified arrangement of tubes, the inner of said heat exchange tubes being arranged in groups of tubes, said groups communicating with the respective header boxes, a framework forming a number of hexagonal openings, rings carried by said header boxes and turnable into one position to be supported by said framework and into another and unsupported position to allow the header boxes to be withdrawn downward through said openings into the lower part of the manifold.

14. In a catalytic contact apparatus, the combination with a casing adapted to contain a catalyst, of a multiplicity of pairs of concentric heat exchange tubes, said pairs being arranged in three series of rows, the rows of each series extending at an angle of 60° to the rows of the other two series, said pairs of tubes extending through the casing and beyond the bottom thereof, a manifold with which the lower ends of the outer of said heat exchange tubes communicate, a number of circular header boxes arranged within said manifold in three series of rows, the rows of each series extending at an angle of 60° to the rows of the other two series, the inner of said heat exchange tubes having their lower ends arranged in groups of tubes, the different groups of tubes being connected with the different header boxes, tubes of each group being curved inward to distribute their lower ends with substantial regularity in the upper wall of the header box with which they are connected, a framework formed of a multitude of beams arranged to form hexagonal compartments, means by which the header boxes may be supported within the respective hexagonal compartments formed by said beams or may be withdrawn downward therethrough, the meeting ends of said beams being offset relative each to the others to accommodate the inner tubes above their curved lower ends when the same are moved downward through said hexagonal compartments.

15. In a catalytic contact apparatus, the combination with a casing adapted to contain a catalyst, of a multiplicity of pairs of concentric heat exchange tubes, said pairs being arranged in three series of rows, the rows of each series extending at an angle of 60° to the rows of the other two series, said pairs of tubes extending through the casing and beyond the bottom thereof, a manifold with which the lower ends of the outer of said heat exchange tubes communicate, a framework, formed of a multitude of beams arranged to form hexagonal compartments, supporting said casing, the meeting ends of said beams being offset relative each to the others to allow the lower ends of all the outer of said heat exchange tubes to extend straight therethrough, a number of header boxes arranged within said manifold, the inner of said heat exchange tubes having their lower ends arranged in groups of tubes, different groups of tubes being connected with different header boxes.

16. In a catalytic contact apparatus, the combination with a casing adapted to contain a catalyst, of a multiplicity of heat exchange tubes extending into said casing and arranged in three series of rows, the rows of each series extending at an angle of 60° to the rows of the other two series, and a framework supporting the casing and comprising beams extending parallel to said three series of rows and forming openings through which groups of said heat exchange tubes extend.

17. In a catalytic contact apparatus, the combination with a casing adapted to contain a catalyst, of a multiplicity of heat exchange tubes extending into said casing and arranged in three series of rows, the rows of each series extending at an angle of 60° to the rows of the other two series, a plurality of header boxes with which groups of adjacent heat exchange tubes respectively communicate, a framework adapted to support said header boxes and comprising beams extending parallel to the three series of rows and forming openings through which said header boxes and the tubes communicating therewith are adapted to be withdrawn.

18. In a catalytic contact apparatus, the combination with a casing adapted to contain a catalyst, of a multiplicity of heat exchange tubes extending into said casing and arranged in three series of rows, the rows of each series extending at an angle of 60° to the rows of the other two series, a framework supporting said casing and comprising beams extending parallel to the three series of rows and forming openings through which groups of said heat exchange tubes respectively extend, a manifold with which the larger and outer of said heat exchange tubes communicate, a number of header boxes arranged within said manifold and with which groups of adjacent tubes of the inner and smaller of said heat exchange tubes communicate, and a framework supporting said header boxes and comprising beams extending parallel to the three series of rows and forming openings in which said header boxes are adapted to be supported and through which said header boxes and the groups of tubes communicating therewith are adapted to be withdrawn.

WALTER SAMANS.